（12） United States Patent
Galyuk

(10) Patent No.: US 10,507,407 B2
(45) Date of Patent: Dec. 17, 2019

(54) METHODS TO REDUCE CHLOROPHYLL CO-EXTRACTION THROUGH EXTRACTION OF SELECT MOIETIES ESSENTIAL OILS AND AROMATIC ISOLATES

(71) Applicant: Yevgeniy Galyuk, Sherman Oaks, CA (US)

(72) Inventor: Yevgeniy Galyuk, Sherman Oaks, CA (US)

(73) Assignee: Capna IP Capital, LLC, Studio City, CA (US)

( * ) Notice: Subject to any disclaimer, the term of this patent is extended or adjusted under 35 U.S.C. 154(b) by 0 days.

(21) Appl. No.: 16/023,531

(22) Filed: Jun. 29, 2018

(65) Prior Publication Data

US 2018/0361271 A1 Dec. 20, 2018

Related U.S. Application Data

(62) Division of application No. 15/488,341, filed on Apr. 14, 2017, now Pat. No. 10,035,081.

(60) Provisional application No. 62/322,751, filed on Apr. 14, 2016.

(51) Int. Cl.
*B01D 11/02* (2006.01)
*C11B 9/02* (2006.01)
*F25B 7/00* (2006.01)

(52) U.S. Cl.
CPC ........ *B01D 11/0219* (2013.01); *B01D 11/028* (2013.01); *B01D 11/0288* (2013.01); *B01D 11/0292* (2013.01); *B01D 11/0296* (2013.01); *C11B 9/025* (2013.01); *F25B 7/00* (2013.01)

(58) Field of Classification Search
CPC ... B01D 11/02; B01D 11/0219; B01D 11/028; B01D 11/0288; B01D 11/0292; B01D 11/0296; C11B 9/025; C11D 311/78
See application file for complete search history.

(56) References Cited

U.S. PATENT DOCUMENTS

| | | | |
|---|---|---|---|
| 2013/0079531 A1* | 3/2013 | Barringer | C07D 311/78 549/390 |
| 2016/0228787 A1* | 8/2016 | Payack | B01D 3/10 |
| 2017/0333503 A1* | 11/2017 | Ayres | A61K 36/81 |
| 2018/0271827 A1* | 9/2018 | Heimark | A23G 4/06 |
| 2018/0344661 A1* | 12/2018 | Finley | A61K 31/192 |

* cited by examiner

*Primary Examiner* — Yate' K Cutliff

(74) *Attorney, Agent, or Firm* — PATNSTR® APC; Peter Jon Gluck, Esq.; Tom Brody

(57) ABSTRACT

A system, machines and methods for extracting select moieties, flavonoids, and essential oils from plant material without co-extracting chlorophyll lipids and other undesirable constituents from plants. Super-cooled extraction techniques are taught. Likewise, according to embodiments methods provides 100% grain ethyl alcohol extract with a concentration of chlorophyll that is below 1%.

23 Claims, 3 Drawing Sheets

METHODS TO REDUCE CHLOROPHYLL CO-EXTRACTION THROUGH EXTRACTION OF SELECT MOIETIES ESSENTIAL OILS AND AROMATIC ISOLATES

CROSS REFERENCE TO RELATED CASES

This application claims priority benefit of U.S. Provisional Ser. No. 62/322,751 filed Apr. 14, 2016, and of U.S. Ser. No. 15/488,341 filed Apr. 14, 2017, now U.S. Pat. No. 10,035,081, issued Jul. 31, 2018, each of which is incorporated by reference herein in its entirety.

BACKGROUND OF THE INVENTION

This invention relates to ways of extracting and concentrating cannabinoids and terpenes from plant substrates including hemp, and particularly modifying the characteristics of the solvent to by-pass undesired constituents of plants throughout the extraction process.

Extraction of industrial hemp and *cannabis* can be done via many methods, using a wide array of FDA approved food grade solvents. The most commonly used solvents are hydrocarbons such as hexane, pentane, butane or propane. Lipid based solvents such as canola oil, soybean oil olive oil, flax seed oil, hemp oil are also commonly used in hemp and *cannabis* extraction methods. Super critical CO2 is also commonly used in *cannabis* extraction, but the expensive machinery and the post extraction steps required to purify an SFE extract of undesired plant lipids, makes SFE the least desirable method for any commercial processor.

Several drawbacks of hydrocarbon extraction methods have been recognized. The most prominent of these drawbacks is the volatility of hydrocarbon solvents. The cost associated with retrofitting a laboratory with explosion proof electronics, ventilation fans etc. create enormous start-up costs. Second, pure hydrocarbon solvents such as N-butane or N-hexane are extremely difficult to obtain and therefore are hardly ever used for *cannabis* extract production. The majority of extracts are created with inferior, low quality butane that contains additives and impurities.

Lipid based extractions are much safer and healthier than hydrocarbons, but separating the cannabinoids or flavonoids from a lipid emulsion requires a thorough understanding of chemistry, as well as expensive distillation devices.

Various states and local governments are now legalizing *cannabis* for medical and recreational use. This creates an entire market of DIY extractions which are obtained through low quality, impure, hydrocarbons such as butane and propane. These extractions not only pose a threat to the consumer, but to the manufacturers as well. Numerous instances have been recorded where home made laboratories have exploded or caught fire because of the unsafe practices of DIY manufacturers.

SUMMARY OF THE INVENTION

The present invention includes a novel extraction process that yields a clean cannabinoid/terpene extract devoid of plant lipids and chlorophyll. Various methods of the present invention are designed to be performed in a food grade manufacturing environment but can also be achieved by a novice manufacturer with minimal investment.

The term extract as used herein should be broadly understood to include both cannabinoid and terpene concentrates and extracts of plant substrate. The terms cannabinoids and terpenes should be construed broadly to include their various isomers.

The term solvent as used herein should be understood to describe 100% grain ethanol.

The method of the present invention includes lowering the temperature of the solvent below −1 C. Preferably to a range of −30 C to −50 C.

The method of the present invention includes lowering the temperature of the plant substrate below −1 C. Preferably to a range of −30 to −50 C.

The method of the present invention requires the solvent to contact the plant substrate for a period of time between 1 minute and 40 minutes.

The method of the present invention includes a filtration step carried out at a temperature between −1 C and −50 C.

The method of the present invention includes a reduction step which can be accomplished via atmospheric evaporation of the solvent.

The method of the present invention includes a solvent recovery step which can be accomplished via simple distillation or rotary evaporator apparatus.

The method of the present invention includes a purging step under vacuum to remove remaining solvent from the extract.

DETAILED DESCRIPTION

The present inventor has evolved systems for extraction using traditional techniques along with super-cooling and achieved unexpected results. Resultory product and resultant processes have re-defined system capabilities and produced plethoric desiderata.

Figure 1:
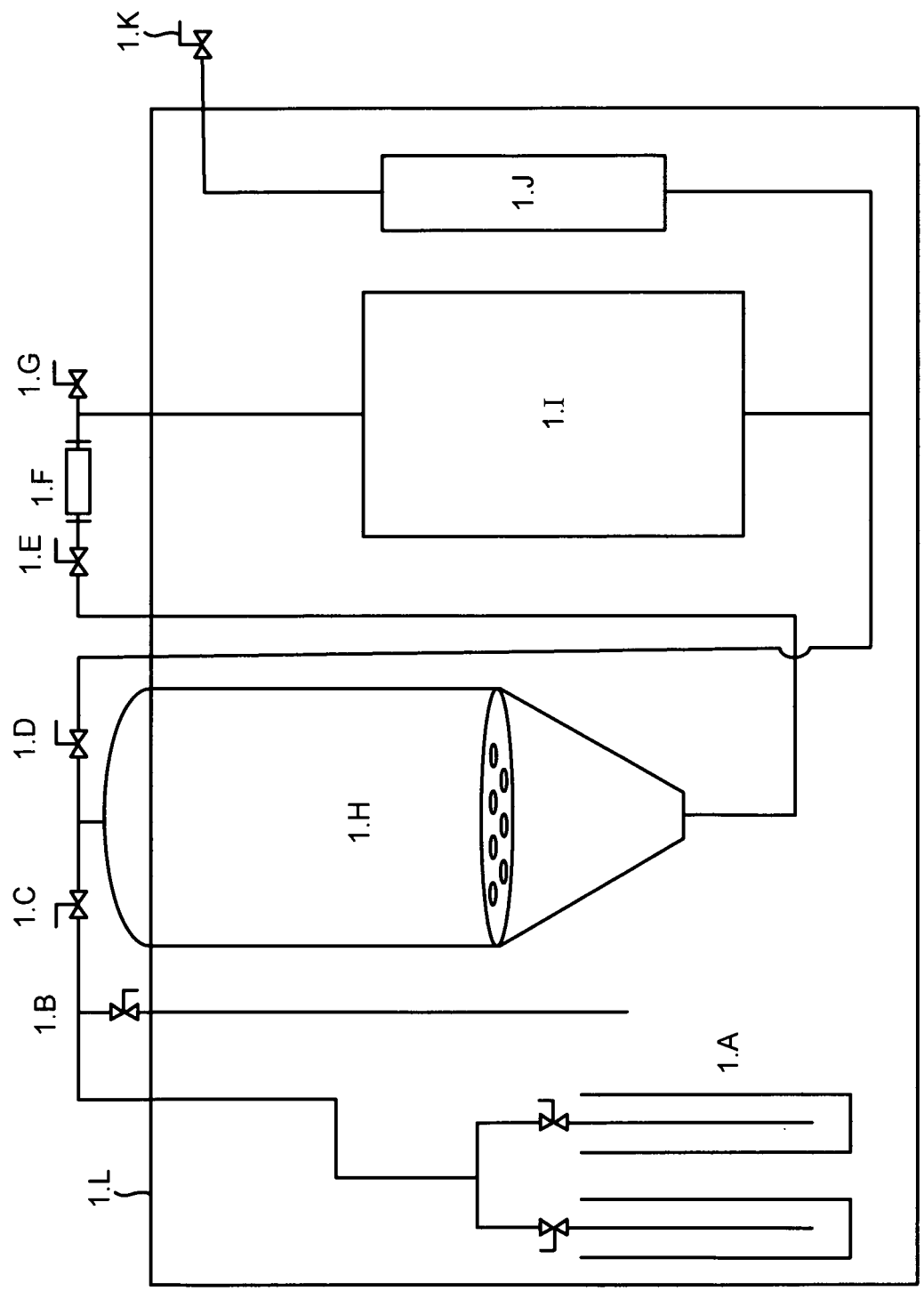
FIG. 1 is a schematic of a system which performs claimed steps in accordance with the present invention.

Referring now to FIG. 1, illustrated is an inventive vessel—wet plumbing and freezer compartment assembly which has produced unexpectedly better results than predicted. Without limiting the technical description to a single mechanism, it is known that super-cooling processes have driven these unexpected results with this system. Solvent storage 1.A is operatively and communicatively linked to cold air intake valve 1B via known lines to those skilled in the art as shown. Solvent flooding valve 1.C then runs via lines to the emulsion return valve 1.D as shown above extraction tank 1.H. Emulsion collection valve 1.E is then ported through sight glass 1.F and down to Extraction tank 1.I and is connected to inline filter housing 1.J along to evacuation valve 1.K. The improvement of enclosure within 1.L the ultra-low freezer compartment has resulted in unexpectedly better results, as further defined and claimed below.

Figure 2:
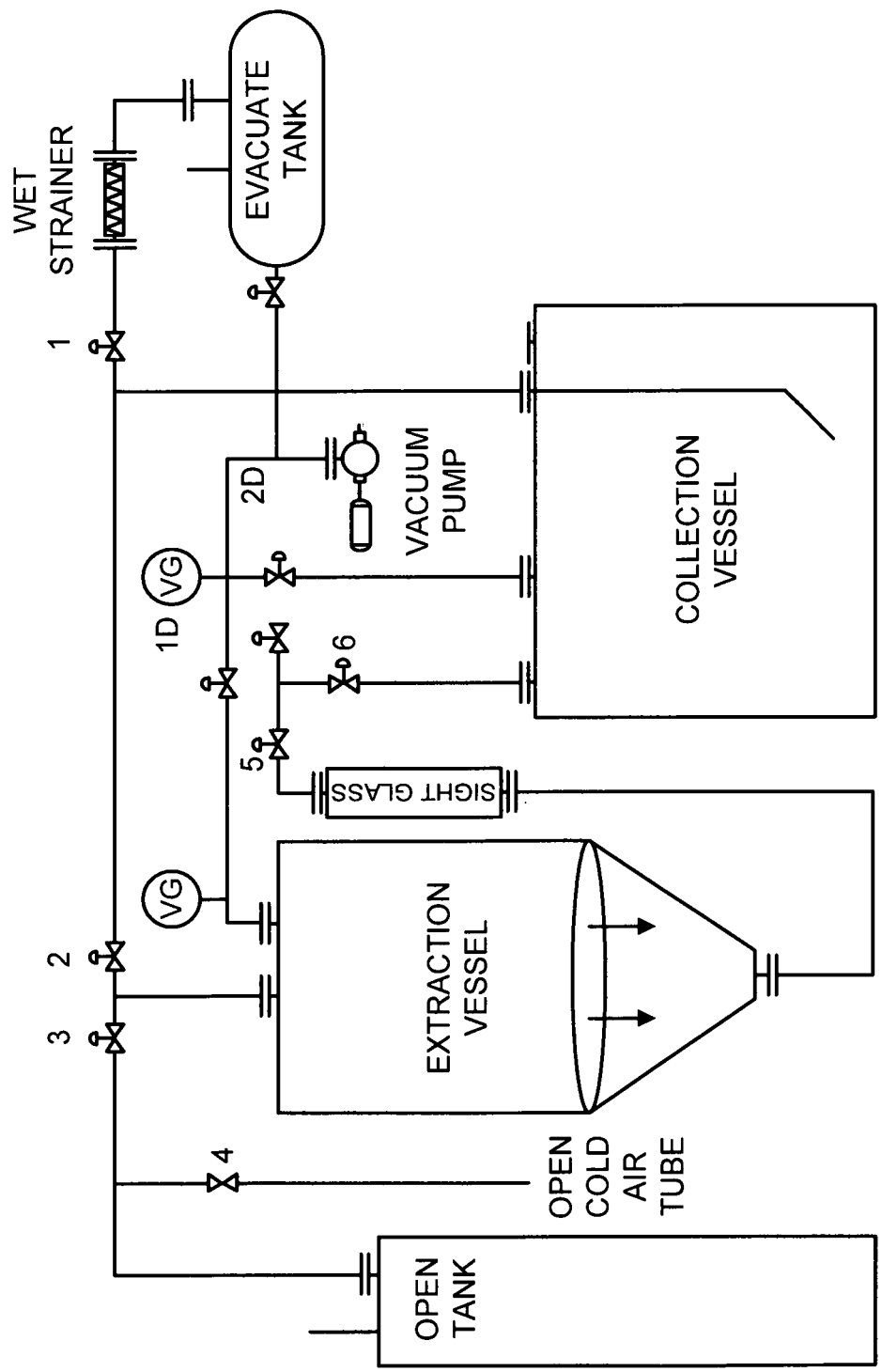
FIG. 2 is a is a schematic of a system which performs claimed steps in accordance with the present invention, showing how the same is improved over prior art technology.
Figure 3:
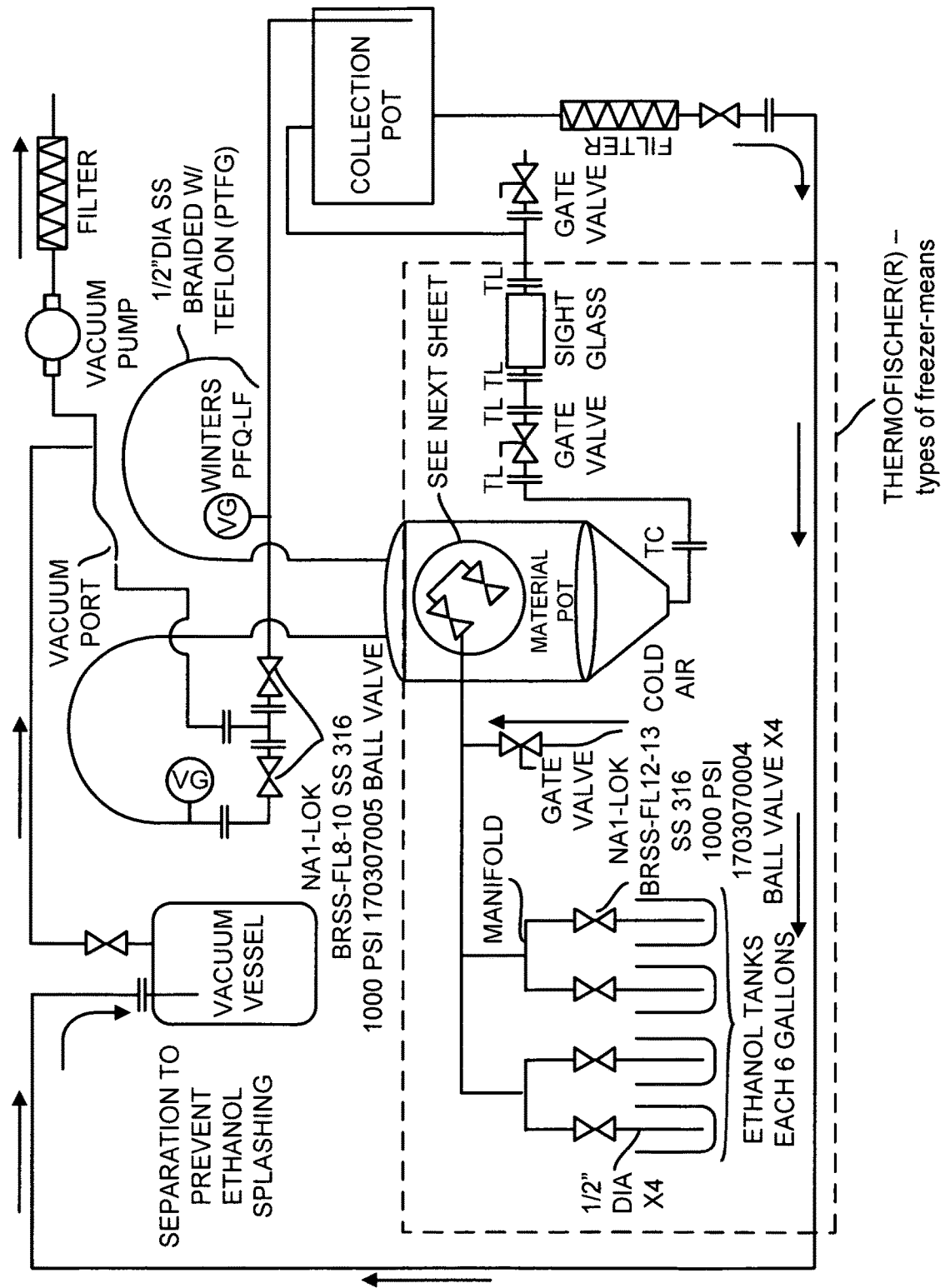
FIG. 3 is a schematic of a system which performs claimed steps in accordance with the present invention, for select moieties and essential oils.

FIG. 2 also shows the plumbing and how the prior arts systems were improved, while FIG. 3 shows optimized systems for select moieties, as discussed above and claimed below. Referring now to both FIGS. 2 and 3, FIG. 2 shows control valves 1, 2, 3, 4 and 6 with gate valve 4, vacuum gage 1D. Those skilled in the art readily understand how this works, so further description is omitted.

As discussed in the 62/322,751, Step 3 of the present invention includes for the necessary amount of contact time between plant substrate and solvent to create a heavy yielding extract emulsion. Contact time should be carried out at a temperature range of −30 C to −50 C.

Step 4 of the present invention includes a filtration step to remove all plant material from the solvent. This step is carried out at a temperature range of −30 C to −50 C.

Step 5a of the present invention includes a process for reduction of the concentrate emulsion by means of atmospheric evaporation of the solvent.

Step 5b of the present invention includes a process for recovery of the solvent from the concentrate emulsion.

Step 6a and 6b of the present invention include a process by which a concentrate can be purged of solvent to produce a nutraceutical in accordance with the present invention.

FIG. 2 is a flow chart of the method which includes the use of an extraction apparatus in accordance with the present invention.

Steps 1 and 2 include the pre-processing step of freezing the solvent and plant substrate to desired temperature between −30 C and −50 C.

Step 3 of the present invention includes the pre-processing step of chilling the extraction apparatus to a temperature between −30 C and −50 C via cryo chiller.

Step 4 of the present invention requires the chilled solvent to be added to pre-chilled extraction vessel.

Step 5 of the present invention requires the chilled plant substrate to be added to extraction vessel.

Step 6 of the present invention includes allowing the solvent to contact the plant substrate for a desired time between 1 minute and 60 minutes.

Step 7a of the present invention includes a solvent evacuation step via positive pressure.

Step 7b of the present invention includes a solvent evacuation step via negative pressure.

Step 8 of the present invention includes a process in which the solvent and plant substrate are separated via inline filtration.

Steps 1 and 2 of the flow chart represent a pre-processing step which includes a method of chilling the solvent and plant substrate to a desired temperature between −1 C and −50 C. preferably in a range between −30 C and −50 C, ideally in a range between −40 C and −45 C. In one embodiment of the present invention, step 1 can be carried out via ultra low freezer set to preferred temperature. In another embodiment of the present invention, step 1 can be carried out via re-circulating cryo chiller connected to a holding vessel filled with solvent.

Step 2 of a process of the present invention can be carried out via ultra low freezer wherein the plant substrate is stored in the ultra low freezer to achieve the desired temperature between −40 C and −45 C. Step 2 of FIG. 1 in the present invention includes, the plant substrate is placed inside of a micro mesh bag and inserted into the extraction vessel of prior to step 3 of FIG. 1 of the provided method.

Step 3 of a process includes that the extraction vessel is stainless steel, aluminum, borosilicate, or ptfe. Step 3 of FIG. 1 includes that the extraction vessel is set inside of a freezer able to maintain the desired temperate of −50 C. Step 3 of FIG. 1 includes the addition of chilled solvent to extraction vessel. Step 3 of FIG. 1 includes a contact time between solvent and plant substrate to allow desired solubles to enter the solvent and create an emulsion rich in essential oils, cannabinoids and terpenes. Step third includes that the desired contact time is between 1 minute and 60 minutes, preferably between 3 and 10 minutes, ideally between 2 and 5 minutes.

Step 4 includes a method for separating the cannabinoid rich emulsion from plant substrate. Step 4, includes a collection vessel is placed into the freezer in which Step 3 of was carried out. Step 4 of includes that a strainer is placed onto the collection vessel and the plant substrate is placed into the strainer to allow for a gravity assisted drain. The draining process must be carried out in the preferred temperature range of −40 C and −45 C to exclude the co-extraction of lipids and chlorophyll during the Step of described. In another embodiment of Step 4, the plant substrate held in a micron bag through Step 3. In this embodiment the plant material is removed with the micron bag. In another embodiment of Step 4 the micron bag filled with the plant substrate is placed inside the strainer to allow the residual solvent to drain into the collection vessel through gravity assist. In another embodiment of Step 4, the collected cannabinoid rich emulsion is then further filtered to remove small particles via Buchner funnel and Erlenmeyer flask with vacuum assist. In this embodiment of the filtration Step 4 ambient room temperature is acceptable as the bulk of plant substrate has been removed via strainer and micron bag.

FIG. 1 shows the use of an extraction apparatus designed to perform extraction in accordance with the present invention.

Steps 1 and 2 of the process represent a pre-process step in which both the solvent and plant substrate are chilled to a desired temperature between −1 C and −SOC, preferably to a temperature between −30 C and −50 C, ideally to a temperature range between −40 C and −45 C. In this embodiment of the aforementioned step, the use of an ultra-low freezer is adequate. In another embodiment of Step 1 the solvent can be chilled via jacketed extraction vessel and cryo chiller assembly. This step requires a long period of time to achieve the desire temperature of the solvent, and therefore it is recommended that an ultra-low storage freezer is acquired to prevent a bottle necking at Step 1 or 2.

Step 3 includes a jacketed extraction vessel such as a chemical reactor. In another embodiment of Step 3 of a jacketed collection vessel, such as a chemical reactor can be added to the apparatus. In this embodiment, the jacketed collection vessel allows to create a re-circulating system to move chilled solvent from collection vessel back into the extraction vessel. Re-circulating chilled solvent over the plant substrate, has been recognized to produce a richer concentration of desired essential oils, cannabinoids, flavonoids and terpenes in the concentrate emulsion. In a third embodiment of Step 3 a jacketed holding vessel such as a chemical reactor, can be added to the apparatus assembly. In this embodiment the holding vessel allows for mechanical feeding of the solvent into the extraction vessel, eliminating strenuous manual labor of pouring solvent into the extraction vessel by hand. In all embodiments of Step 3 the vessels must be able to maintain a desired temperature range of −40 C to −45 C. A cryo chiller has been recognized as an effective device to chill the extraction apparatus by circulating a cooling solution throughout the jackets of the vessel included in the apparatus assembly.

Step 4a includes a process in which the chilled solvent is transferred into the collection vessel. Step 1 of FIG. 2 allows for the solvent to be chilled within the vessel via circulation of cooling solution within the jacket walls of the vessel. Step 4b includes a process in which the plant substrate is placed inside the extraction vessel of the apparatus. In one embodiment the plant substrate can be loosely placed inside the extraction vessel. In another embodiment the extraction vessel is lined with a micron mesh screen bag prior to the introduction of the plant substrate into the vessel. Lining the extraction vessel with a micron screen bag allows for immediate separation of concentrate emulsion and plant substrate during the concentrate emulsion evacuation of Steps 6a and 6b. This method also allows for the quick evacuation of plant substrate from the extraction vessel by simply removing the bag filled with plant substrate out of the vessel.

Step 5 allows for contact time between chilled solvent and chilled plant substrate. The contact period should be carried out at the ideal temperature range between −40 C and −45 C. Contact time can be between 1 minute and 60 minutes, preferably between 3 minutes and 10 minutes, ideally between 1 minute and 5 minutes.

Step 7 includes a process of inline separation of concentrate emulsion and plant substrate. An embodiment Step 4b of FIG. 2 provides that plant substrate is placed within a micron mesh bag prior to its introduction into the extraction vessel. This embodiment of Step 4b has been recognized as the most simple and cost effective way of inline filtration. In another embodiment of Step 7, a solid stainless steel micron screen can be introduced via a false bottom inside the extraction vessel. In this embodiment of Step 7, the plant substrate sits atop the false bottom stainless micron mesh as the concentrate emulsion is drawn through it and out of the extraction vessel. In a third embodiment of Step 7 a filter holder can be introduced in line between the extraction vessel and collection vessel into the apparatus assembly.

Step 8 of FIG. 2 includes the collection of concentrate emulsion from the extraction vessel into a jacketed collection vessel referenced in embodiments of Step 3.

Step 9a includes a process of recirculation of concentrate emulsion back over the plant substrate to create a richer concentration of desired constituents of the plant substrate. Recirculation can be performed via mechanical solvent pump, positive pressure in collection vessel, or negative pressure within extraction vessel. The preferred method for recirculation is by manipulating pressure within the vessels. Moving the concentrate emulsion from vessel to vessel via negative pressure has proven to be the most cost effective as vacuum pumps have a long life expectancy and do not require much maintenance. Pressurizing the vessels to move the concentrate emulsion has also been recognized as effective, but the added expense of food grade nitrogen or expensive moisture traps and filters for ambient air compressors have proven to be burdensome. Mechanical solvent pumps have been recognized as an effective means of moving the solvent and concentrate emulsion, but the costs associated with such devices would deter small operators from applying this method.

Step 9b includes a method for evacuating the concentrate emulsion from the collection vessel. As referenced in Step 9a, moving the solvent or concentrate emulsion can be achieved via positive or negative pressure within the vessels of the apparatus. For evacuation, it is been discovered that a simple drain at the bottom vessel is suitable for evacuation of the concentrate emulsion. Positive pressure can be applied to the collection vessel to expedite the evacuation process.

Step 10 provides a method for separating the concentrate from solvent via rotary evaporator, simple distillation, or atmospheric evaporation. The preferred method is rotary evaporator as this method allows for recovery of the solvent in its entirety. The recovered solvent is put back into circulation for future extraction, making this method one of the most cost effective for any processor.

According to another embodiment of the system, other features are taught. In another embodiment of the present invention, a system comprising of jacketed reactor extraction vessel, jacketed reactor collection vessel, plumbing, valves, hoses, ultra low circulating chiller, vacuum pump, liquid nitrogen holding Dewar, pressure regulators, LN2 phase separators, pneumatic actuators, electronic relay switches and air compressor.

In this embodiment the system is scaled for larger throughput, with vessels capable of holding up to 20 LBS of plant material and up to 40 gallons of solvent.

In this embodiment of the present invention, an ultra-low circulating chiller is attached to the jackets on the reactor vessels.

The ultra-low recirculating chiller is set to the desired temperature set point of −75 C and allowed time to chill the internal chamber of the reactor vessels.

The vessels are interconnected via sanitary plumbing, pneumatic actuated valves in a manner which allows for the transfer of solvent into the extraction tank, and the recollection of the extract rich emulsion produced during extraction back into the collection vessel.

In this embodiment, the collection vessel acts as the solvent storage vessels prior to commencing the extraction. During extraction procedure, the collection vessel acts as an intermittent emulsion storage vessel during recirculation procedures.

Plant material is loaded into a mesh screen bag and placed inside the extraction vessel. Allowing time for the material to chill to a desired temperature of below −35 C, preferably below −45 C, ideally below −55 C.

Solvent is placed inside the collection and allowed time to chill to the necessary temperature range between −45 and −75 C. It has been discovered that the ideal extraction temperature is in the range of −45 C and −50 C system parameters are always set to a lower temperature to compensate for the heating of solvent and material during fluid transfers. The solvent will typically gain 5 degrees during each fluid transfer. A typical recirculation procedure requires the solvent to be moved up to 5 times from extraction vessel to collection vessel and back. This raises the overall temperature of the solvent in the system by up to 25 degrees Celsius.

In another embodiment of the present invention, a solvent transfer pump can be employed to move solvent from one vessel to the next, or to recirculate the emulsion within the extraction vessel. Mechanical pumps have shown to be efficient but tend to generate more heat the desired, therefore heating the solvent during fluid transfers or recirculation. The method does not predictably work as desired in that lipids and chlorophyll become available to the solvent at temperatures above −40 C.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used 1n the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Specific embodiments disclosed herein may be further limited in the claims using consisting of or consisting essentially of language. When used in the claims whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the invention so claimed are inherently or expressly described and enabled herein.

Furthermore, numerous references have been made to patents and printed publications throughout this specification. Each of the above-cited references and printed publications are individually incorporated herein by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

What is claimed is:

1. A safer and more reliable extraction process for extracting a plant substrate comprising, in combination,
    (i) pre-processing comprising lowering the temperature of a solvent to a range of −30 degrees C. and −50 degrees C.,
    (ii) contacting at −30 degrees C. and −50 degrees C. wherein there is a contacting time between the plant substrate and the solvent to create an emulsion,
    (iii) evaporating for reduction of the emulsion by means of atmospheric evaporation of the solvent,
    (iv) recovering for recovery of the solvent from the emulsion,
    (v) purging whereby a resultory extract is substantially free of any lipids and chlorophyll.

2. The process according to claim 1, wherein the solvent is 100% grain ethanol.

3. The process according to claim 1, wherein what is extracted is industrial hemp.

4. The extraction process of claim 1, wherein what is extracted is *cannabis*.

5. The extraction process of claim 1, wherein the pre-processing step comprising bringing the solvent to between −30 degrees C. and −50 degrees C.

6. The extraction process of claim 1, wherein the pre-processing step comprising chilling the plant substrate to a temperature between −30 degrees C. and −50 degrees C.

7. The extraction process of claim 1, wherein the pre-processing step includes chilling the solvent and the plant substrate to be in a range between −30 degrees C. and −50 degrees C., or to be in a range between −40 degrees C. and −45 degrees C.

8. The extraction process of claim 1, wherein the contacting step creates an emulsion that is a concentrate emulsion or an extract emulsion.

9. The extraction process of claim 1, wherein the contacting step is carried out at a temperature range of −30 degrees C. to −50 degrees C.

10. The extraction process of claim 1, wherein the contacting step allows the solvent to contact the plant substrate for between 1 minute and 60 minutes.

11. The process according to claim 1, that includes a solvent recovery step which can be accomplished via distillation or a rotary evaporator apparatus.

12. The process of claim 1, wherein the purging step occurs under vacuum to remove remaining solvent from the emulsion.

13. The process of claim 1, wherein the contacting step takes place in an extraction vessel.

14. The process of claim 13, wherein in the contacting step, the plant substrate is in a micron micromesh bag that lines the extraction vessel.

15. The process of claim 13, wherein in the contacting step, the plant substrate is loosely placed inside the extraction vessel.

16. The process of claim 1, wherein the plant substrate is inside a pre-chilled extraction vessel,
   wherein the contacting step comprises chilled solvent added to the pre-chilled extraction vessel,
   allowing the solvent to contact the plant substrate for a desired contact time to allow desired solubles to enter the solvent to create an emulsion that is rich in essential oils, cannabinoids, and terpenes.

17. The process of claim 16, wherein the plant substrate is placed inside of a micromesh bag and wherein the emulsion is drawn through the micromesh bag and out of the extraction vessel.

18. The process of claim 16, further comprising recirculation of emulsion back over the plant substrate to create a richer concentration of desired constituents.

19. The process of claim 16, further comprising the collection of emulsion from the extraction vessel into a jacketed collection vessel wherein the collection vessel comprises a bottom.

20. The process of claim 16, further comprising the collection of emulsion from the extraction vessel into a jacketed collection vessel, and further comprising recirculating of the emulsion back over the plant substrate in the extraction vessel, to create a richer concentration of desired constituents of the plant substrate, wherein recirculation is by manipulating pressure via negative pressure or positive pressure using a vacuum pump.

21. The process of claim 19, further comprising evacuating the concentrate from the collection vessel through a drain at the collection vessel bottom.

22. The process of claim 19, further comprising evacuating the concentrate from the collection vessel through a drain at the vessel bottom, wherein the draining process is carried out at a preferred temperature range of −40 degrees C. and −45 degrees C., to exclude the co-extraction of lipids and chlorophyll.

23. The process of claim 19, further comprising evacuating the concentrate from the collection vessel through a drain at the collection vessel bottom, wherein the draining process is carried out at a preferred temperate range of −30 degrees C. and −50 degrees C., to exclude the co-extraction of lipids and chlorophyll.

* * * * *

UNITED STATES PATENT AND TRADEMARK OFFICE
CERTIFICATE OF CORRECTION

| | |
|---|---|
| PATENT NO. | : 10,507,407 B2 |
| APPLICATION NO. | : 16/023531 |
| DATED | : December 17, 2019 |
| INVENTOR(S) | : Yevgeniy Galyuk |

It is certified that error appears in the above-identified patent and that said Letters Patent is hereby corrected as shown below:

In the Claims

Replace Claim 1 Column 8, Line 19:
(ii) contacting at –30 degrees C. and –50 degrees C.

With:
(ii) contacting at –30 degrees C. to –50 degrees C.

Signed and Sealed this
Twenty-eighth Day of March, 2023

Katherine Kelly Vidal
*Director of the United States Patent and Trademark Office*